(12) United States Patent
Cunningham

(10) Patent No.: US 6,530,395 B2
(45) Date of Patent: Mar. 11, 2003

(54) CHECK VALVE ARRANGEMENT

(75) Inventor: Michael James Cunningham, Romeo, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/888,864

(22) Filed: Jun. 25, 2001

(65) Prior Publication Data

US 2002/0195146 A1 Dec. 26, 2002

(51) Int. Cl.$^7$ ................................................ F16K 15/08
(52) U.S. Cl. ........................... 137/512.1; 137/516.23; 137/903
(58) Field of Search ...................... 137/512.1, 512.2, 137/512.3, 512.5, 543.19, 516.21, 516.23, 903; 251/356

(56) References Cited

U.S. PATENT DOCUMENTS

| | | | | |
|---|---|---|---|---|
| 601,059 A | * | 3/1898 | De Laval ................. | 137/512.3 |
| 852,589 A | * | 5/1907 | Weir ....................... | 137/512.1 |
| 1,413,059 A | * | 4/1922 | Riesner .................... | 137/512.1 |
| 1,490,141 A | * | 4/1924 | Stoms ...................... | 137/512.1 |
| 1,607,324 A | * | 11/1926 | Voss ........................ | 137/512.3 |
| 1,630,666 A | * | 5/1927 | McEvoy ................... | 137/512.1 |
| 1,651,235 A | * | 11/1927 | Terrill ..................... | 137/512.1 |
| 1,707,306 A | * | 4/1929 | Holdsworth ............. | 137/512.1 |
| 1,834,590 A | * | 12/1931 | Holdsworth ........... | 137/516.23 |
| 2,175,993 A | * | 10/1939 | Lighton ..................... | 137/903 |
| 2,703,102 A | * | 3/1955 | Neugebauer ............ | 137/512.1 |
| 3,156,259 A | * | 11/1964 | Havelka et al. ........ | 137/516.23 |
| 3,773,108 A | * | 11/1973 | Chiaves ............. | 137/516.21 X |
| 3,969,847 A | * | 7/1976 | Campagna et al. ...... | 137/512.1 |
| 4,028,243 A | * | 6/1977 | Offer et al. ......... | 137/516.23 X |
| 4,257,444 A | * | 3/1981 | Ogle, Jr. et al. ............ | 137/315 |
| 4,273,155 A | * | 6/1981 | Euerle .................... | 137/543.17 |
| 4,520,908 A | * | 6/1985 | Carpenter .................... | 280/707 |
| 5,176,171 A | * | 1/1993 | Andersson ................ | 137/512.1 |
| 5,230,128 A | * | 7/1993 | Norman ............... | 137/512.1 X |
| 5,411,054 A | * | 5/1995 | Overfield ................. | 137/512.1 |
| 5,711,343 A | * | 1/1998 | Beckett .................... | 137/512.1 |
| 5,918,628 A | * | 7/1999 | Harding .................... | 137/512.1 |

* cited by examiner

Primary Examiner—John Rivell
(74) Attorney, Agent, or Firm—Rader, Fishman & Grauer PLLC

(57) ABSTRACT

A check valve arrangement utilizes a disc (15) for a valve member while eliminating the need for a ball. A valve seat in the common sense is unnecessary, too. Instead, a substantially flat surface (13) interacts with the disc (15). In order to allow unidirectional flow only, the disc (15) is biased toward the surface (13) by means of an elastic bias ring (17) which itself is held in place by a retainer (6) extending through the center hole (16) of the disc (15) and thereby axially guiding the disc (15).

If desired, the flat surface (13) can be supplemented with an embedded sealing ring 18 to provide optimum sealing properties without precise machining of the surface (13).

By designing the disc (15) and the retainer (6) in rotational symmetry, a directional adjustment of the parts is made unnecessary.

6 Claims, 1 Drawing Sheet

CHECK VALVE ARRANGEMENT

BACKGROUND OF THE INVENTION

The present invention relates to a check valve arrangement allowing unidirectional flow of a pressure medium while preventing fluid flow in the opposite direction.

Commonly used check valves include a channel opening into a valve chamber with a valve seat machined around the opening. A closure member, e.g. a steel ball, interacts with the valve seat to open or close the valve. Sometimes, the closure member is spring-biased toward the valve seat. When the pressure in the channel exceeds the pressure in the valve chamber and, if applicable, exerts an opening force greater than the spring force, the closure member is lifted off the valve seat, and fluid can flow from the channel through the opening into the valve chamber. However, if the pressure conditions change, the closure member shuts off the channel opening and prevents a flow of fluid in the opposite direction.

A check valve as it is currently used in a hydraulic anti-lock brake system includes steel balls that serve as valve closure elements and interact with valve seats machined into fluid channels. To this end, each channel has a widened port accommodating the steel ball. Where the channel gets narrower, the valve seat must be machined with high precision in order to provide a leak-proof closure of the check valve. To prevent the steel balls from falling out of their cavity, a retainer is provided. This retainer is basically pot-shaped with a rim that is bent outwardly and partially covers the channel ports.

The housing of this check valve is designed as a cartridge that can be inserted into a valve block accommodating all valves of an anti-lock brake system, for instance. The housing includes a center cavity for insertion of an electromagnetically operated valve which is by-passed by the channels having the check valves. With its pot-shaped portion, the retainer is press-fitted into a housing recess which is an extension of the center cavity. In order to open up a center channel for fluid coming from the center cavity, the retainer pot has a hole in its bottom.

This arrangement using a ball-type check valve generates undesired noise when the loose ball is hitting against the valve seat and the retainer.

It is therefore the object of the invention to provide a check valve that has a lower number of freely moving parts in order to reduce noise.

Another object of the invention is to design a valve that is easy to manufacture and therefore relatively cheap.

SUMMARY OF THE INVENTION

These objects are achieved with a check valve arrangement comprising a housing with a substantially flat surface area; at least one channel with an opening in the substantially flat surface area; a disc having a center hole and covering the channel opening; a retainer having a first portion extending through the center hole and fastened to the housing and having a second portion formed as a rim with a diameter larger than the center hole and a distance from the housing greater than the thickness of the disc; and a bias ring positioned between the rim and the disc and biasing the disc toward the housing.

A valve arrangement as proposed utilizes a disc for a valve member while eliminating the need for a ball. A valve seat in the common sense is unnecessary, too. Instead, a substantially flat surface interacts with the disc. In order to allow unidirectional flow only, the disc is biased toward the surface by means of an elastic bias ring which itself is held in place by a retainer extending through the center hole of the disc and thereby axially guiding the disc.

If desired, the flat surface can be supplemented with an embedded sealing ring to provide optimum sealing properties without precise machining of the surface.

By designing the disc and the retainer in rotational symmetry, a directional adjustment of the parts is made unnecessary.

The probably cheapest way of manufacturing a suitable retainer is to bend sheet metal into the desired shape.

If desired, this retainer can as well be provided with a center hole to open a passage for fluid as it has been realized in the prior-art example.

The invention will be described in further detail making reference to the attached drawings.

DETAILED DESCRIPTION OF THE DRAWINGS

Figure 1:
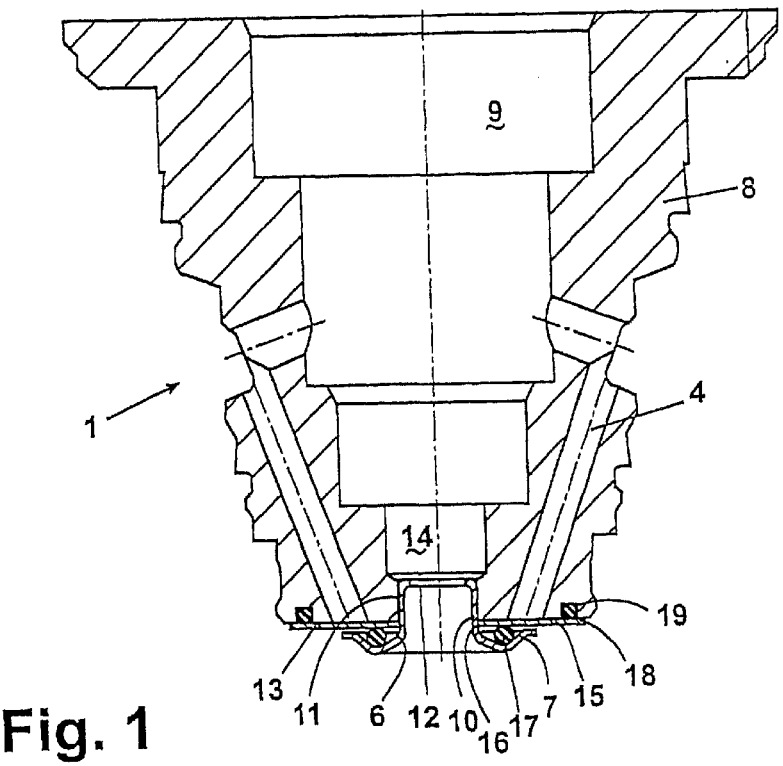
FIG. 1 shows a check valve according to the present invention utilizing a disc and a substantially flat surface for a valve closure member and a valve seat.
Figure 2:
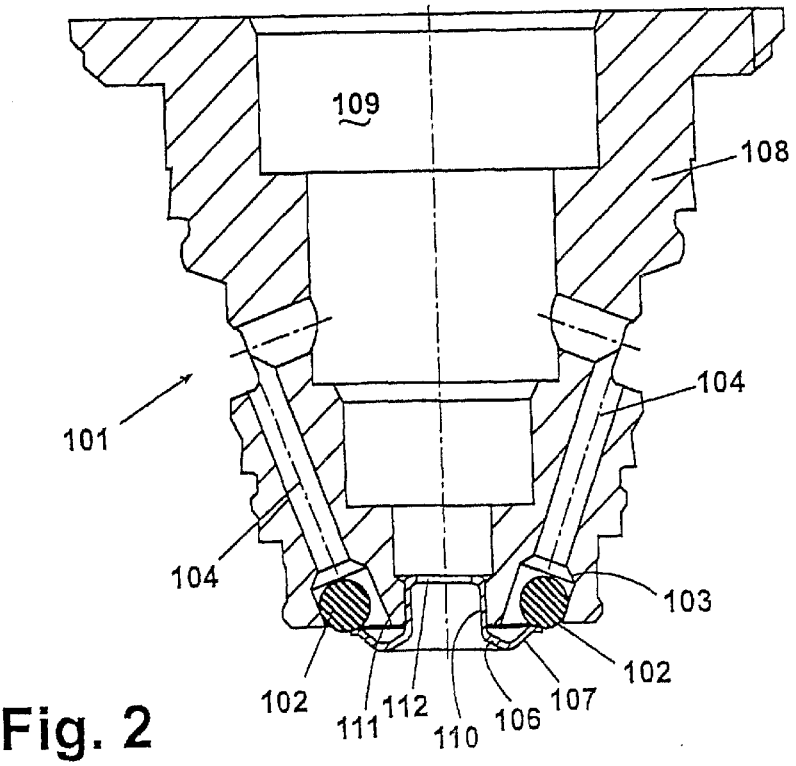
FIG. 2 shows a check valve as currently in use.

Check valve 1, shown in FIG. 1, comprises a housing 8 that is very similar to the housing of a check valve currently in use and shown in FIG. 2. It includes a center cavity 9 with bypass fluid channels 4 which open into a substantially flat surface 13. The entire valve 1, except for the fluid channels 4, is substantially designed in rotational symmetry so that during assembly no angular adjustment of the parts is necessary. The center cavity 9 also has connection to that surface 13 via a center channel 14 and a recess 11. A metal disc 15 with a center hole 16 covers, at least partially, the substantially flat surface 13 and thereby the ports of the fluid channels 4, while its center hole 16 is in alignment with the recess 11. In order to bias the disc 15 toward the surface 13, a retainer 6 having a central pot-shaped portion 10 and an outwardly extending rim 7 is press-fitted into the recess 11 with its pot-shaped portion 10. The pot 10 has a hole 12 in order to open the fluid connection between the center channel 14 and the recess 11. Between the rim 7 and the disc 15, an elastomeric bias ring 17 is arranged in order to exert an elastic force onto the disc 15 toward the surface 13. Both disc 15 and retainer 6 are manufactured of sheet metal so that manufacturing costs are minimal.

In the shown fluid-pressure-free state of the check valve 1, the rim 7 does not touch the disc 15 and thereby allows the disc to compress the bias ring 17 and lift off the surface 13 when the channels 4 contain pressurized fluid. By this means, a fluid flow is possible from channels 4 to the area beyond surface 13. However, a flow in the opposite direction is prevented by the disc 15, which stays attached to the surface 13 unless the pressure in the channels 4 exceeds the pressure beyond the disc 15 enough to compress the bias ring 17. In order to enhance the sealing properties of the disc 15 without the requirement of high-precision machining of the surface 13, the present embodiment comprises a sealing ring 18 embedded in an annular groove that is arranged radially outwardly of the channels 4 in an annular groove 19. This sealing ring 18, however is optional. If the sealing properties of disc 15 and surface 13 are sufficient, sealing ring 18 is unnecessary. It is obvious that another sealing ring may be arranged radially inwardly of the channels 4, or each channel can be surrounded by a separate sealing ring if desired.

This check valve 1 according to the present invention is of even simpler structure than currently used valves and has no freely movable parts. It is therefore less prone to causing noise or to wear.

FIG. 2 shows a check valve 101 as it is currently used in a hydraulic anti-lock brake system. Steel balls 102 serve as valve closure elements and interact with valve seats 103 machined into fluid channels 104. To this end, each channel 104 has a widened port 105 accommodating the steel ball. Where the channel gets narrower, the valve seat 103 must be machined with high precision in order to provide a leakproof closure of the check valve. To prevent the freely moving steel balls 102 from falling out of their cavity, i.e. port 105, a retainer 106 is provided. This retainer 106 is basically pot-shaped with a rim 107 that is bent outwardly and partially covers the channel ports 105.

The housing 108 of this check valve is designed as a cartridge that can be inserted into a valve block accommodating all valves of an anti-lock brake system, for instance. The housing 108 includes a center cavity 109 for insertion of an electro-magnetically operated valve which is by-passed by the channels 104 including the check valves 102/103. With its pot-shaped portion 110, the retainer is press-fitted into a housing recess 111 which is an extension of the center cavity 109. In order to open up a center channel for fluid coming from the center cavity 109, the retainer pot 110 has a hole 112 in its bottom.

This arrangement using a ball-type check valve generates undesired noise when the loose ball is hitting against the valve seat and the retainer.

I claim:

1. A check valve arrangement comprising:
    a housing with a substantially flat surface area;
    at least one-channel with an opening in the substantially flat surface area;
    a disc having a center hole and covering the channel opening;
    a retainer having a first portion extending through the center hole and disposed within the housing and having a second portion formed as a rim with a diameter larger than the center hole and positioned at a distance from the housing greater than the thickness of the disc; and
    a bias ring positioned between the rim and the disc and biasing the disc toward the housing.

2. A valve arrangement according to claim 1, wherein the disc, the bias ring and the retainer are shaped and arranged substantially rotational-symmetric about an axis perpendicular to the substantially flat surface and extending through the center hole.

3. A valve arrangement according to claim 1, wherein the retainer is hollow and allows a flow of fluid through the center hole.

4. A valve arrangement according to claim 1, wherein the retainer is fastened to the housing by press-fitting the first portion into a recess in the housing.

5. A valve arrangement according to claim 4, wherein the retainer is a pot-shaped sheet-metal part with a formed-on rim and with a hole in the bottom.

6. A valve arrangement according to claim 1, wherein at least one sealing ring surrounding the at least one channel opening is embedded in the substantially flat surface area and is covered by the disc.

* * * * *